US006146545A

United States Patent [19]

Murase

[11] Patent Number: 6,146,545

[45] Date of Patent: Nov. 14, 2000

[54] RADIO WAVE ABSORBENT

[75] Inventor: Taku Murase, Tokyo, Japan

[73] Assignee: TDK Corporation, Tokyo, Japan

[21] Appl. No.: 09/453,074

[22] Filed: Dec. 2, 1999

[30] Foreign Application Priority Data

Dec. 4, 1998 [JP] Japan .................................. 10-361842

[51] Int. Cl.[7] ...................................................... C04B 35/01

[52] U.S. Cl. ............................................................ 252/62.56

[58] Field of Search ............................................ 252/62.56

[56] References Cited

U.S. PATENT DOCUMENTS

| | | | |
|---|---|---|---|
| 5,711,893 | 1/1998 | Park | 252/62.62 |
| 5,841,067 | 11/1998 | Nakamura et al. | 174/35 MS |

FOREIGN PATENT DOCUMENTS

| | | |
|---|---|---|
| 64-72925 | 3/1989 | Japan . |
| 1-301524 | 12/1989 | Japan . |
| 3-200303 | 9/1991 | Japan . |
| 5-129123 | 5/1993 | Japan . |
| 6-84622 | 3/1994 | Japan . |
| 2794293 | 6/1998 | Japan . |

*Primary Examiner*—Ngoclan Mai
*Attorney, Agent, or Firm*—Oblon, Spivak, McClelland, Maier & Neustadt, P.C.

[57] ABSTRACT

A radio wave absorbent which comprises, as a main component, a manganese-nickel-copper-zinc system ferrite comprising 2.0 to 14.5 mol % of nickel oxide, 3.5 to 17.0 mol % of copper oxide, 30.0 to 33.0 mol % of zinc oxide, 0.5 to 10.0 mol % of manganese oxide, and 40.0 to 50.5 mol % of iron oxide. By virtue of the above-mentioned composition, the radio wave absorbent of the present invention is advantageous not only in that the reflectivity in a wide frequency band of from a low frequency is -20 dB or less, but also in that the matching thickness is small, thus enabling lowering of the production cost.

3 Claims, No Drawings

RADIO WAVE ABSORBENT

BACKGROUND OF THE INVENTION

The present invention relates to a radio wave absorbent for use in an anechoic chamber, a radio wave absorptive wall and the like, which is composed of a nickel-zinc system ferrite.

Recently, with the progress of information communication technique or the prevalence of various electric apparatus, the influence of unnecessary electromagnetic noises exerted onto precision apparatus associated devices has posed problems. For the measurement of electromagnetic noises, an anechoic chamber where there is no reflection of electromagnetic waves is used, and a radio wave absorbent is used in the inner wall of the anechoic chamber. Moreover, in order to prevent a reception trouble caused by the reflection of television waves by high-rise buildings and the like, the radio wave absorbent is used in the outer wall of a building and the like. In addition, a large amount of such a radio wave absorbent is used in the inner wall of an anechoic chamber, the outer wall of a building and the like. Therefore, there has been a demand for the reduction of the production cost for the radio wave absorbent.

As a conventional radio wave absorbent, for example, use is made of a radio wave absorbent having characteristics such that a reflectivity in a frequency band of 40 MHz to 450 MHz is −20 dB or less. As such a radio wave absorbent, for example, a radio wave absorbent obtained by sintering a magnesium-zinc system ferrite material (Japanese Patent Application Laid-open Specification Nos. 72925/1989 and 301524/1989, and the like), and a radio wave absorbent obtained by sintering a nickel-zinc system ferrite material (Japanese Patent No. 2794293, Japanese Patent Application Laid-open Specification Nos. 129123/1993, 200303/1991 and 84622/1994, and the like) are exemplified.

The cost for a raw material used for producing a magnesium-zinc system ferrite material is relatively low. However, this ferrite material needs to be sintered at a temperature as high as 1,250° C. or more, and hence, there has been a problem in that a high-temperature sintering furnace especial for this magnesium-zinc system ferrite material is required. Further, the matching thickness of the radio wave absorbent obtained by sintering the magnesium-zinc system ferrite material is as large as about 8 mm. Therefore, when such a radio wave absorbent is used in the inner wall of an anechoic chamber, the outer wall of a building and the like, the reduction of the total weight of the radio wave absorbent used is inevitably limited.

On the other hand, each of Japanese Patent No. 2794293 and Japanese Patent Application Laid-open Specification No. 129123/1993 discloses a radio wave absorbent comprising a nickel-zinc system ferrite material in which the range of the composition for nickel oxide, copper oxide, zinc oxide and iron oxide is defined. In this connection, it should be noted that, particularly, with respect to the anechoic chamber where an electromagnetic noise of a precision apparatus associated device is measured, a frequency band for the evaluation of the electromagnetic noise is standardized, that is, it is necessary that the reflectivity in a frequency band of 30 to 1,000 MHz be −20 dB or less. However, in the nickel-zinc system ferrite material disclosed in each of Japanese Patent No. 2794293 and Japanese Patent Application Laid-open Specification No. 129123/1993, the range of the composition which satisfies characteristics such that the matching thickness is 6.5 mm or less and the reflectivity at 30 MHz or more is −20 dB or less is very narrow. Therefore, it was difficult to control the production of such a radio wave absorbent.

In addition, Japanese Patent Application Laid-open Specification No. 200303/1991 discloses a radio wave absorbent comprising a nickel-copper-zinc ferrite which contains 7% by weight or less of titanium oxide. Further, Japanese Patent Application Laid-open Specification No. 84622/1994 discloses a radio wave absorbent comprising a nickel-copper-zinc ferrite which contains at least one subcomponent selected from 0.05% by weight or less of silicon dioxide and 0.10% by weight or less of manganese monoxide, wherein titanium dioxide, vanadium pentaoxide and hafnium oxide are contained as additives. There is a report that the addition of this titanium dioxide is effective for lowering the lower limit of the frequency band satisfying the reflectivity of −20 dB or less.

However, generally, when titanium dioxide is added to the nickel-zinc system ferrite as well as the magnesium-zinc system ferrite and the manganese-zinc system ferrite, a solid solution occurs not only at the inside of a crystal but also in a grain boundary phase. Therefore, when titanium dioxide, vanadium pentaoxide, hafnium oxide and the like in high concentrations constitute a grain boundary phase having no magnetic property as mentioned above, the matching thickness is caused to become large. The matching thickness exerts a remarkable influence on the total weight of the radio wave absorbent used in the inner wall of an anechoic chamber or the outer wall of a building or the like, and hence, the reduction of the matching thickness is always desired for the radio wave absorbent.

SUMMARY OF THE INVENTION

In view of the above, the present invention has been developed, and an object of the present invention is to provide a radio wave absorbent which is advantageous not only in that the reflectivity in a wide frequency band of from a low frequency is −20 dB or less, but also in that the matching thickness is small, thus enabling lowering of the production cost.

For attaining the above object, the radio wave absorbent of the present invention is a radio wave absorbent obtained by sintering a manganese-nickel-copper-zinc system ferrite material, and has a construction such that it comprises, as a main component, a manganese-nickel-copper-zinc system ferrite comprising 2.0 to 14.5 mol % of nickel oxide, 3.5 to 17.0 mol % of copper oxide, 30.0 to 33.0 mol % of zinc oxide, 0.5 to 10.0 mol % of manganese oxide, and 40.0 to 50.5 mol % of iron oxide.

Further, in the radio wave absorbent of the present invention, the manganese-nickel-copper-zinc system ferrite may comprises 10.0 to 12.5 mol % of nickel oxide, 5.0 to 8.5 mol % of copper oxide, 31.5 to 32.7 mol % of zinc oxide, 1.0 to 3.0 mol % of manganese oxide, and 46.2 to 48.5 mol % of iron oxide, wherein the total content of the manganese oxide and the iron oxide is in the range of from 49.1 to 49.8 mol %.

Still further, in the radio wave absorbent of the present invention, the reflectivity at 30 MHz may be −20 dB or less and the matching thickness may be 6 mm or less.

In the present invention, the matching thickness of the radio wave absorbent is as small as 6.5 mm or less. Therefore, when the radio wave absorbent of the present invention is used in the inner wall of an anechoic chamber, the outer wall of a building and the like, it is possible to considerably reduce the total weight of the radio wave absorbent used. Further, in the radio wave absorbent of the present invention, the reflectivity in a wide frequency band of from a frequency as low as 40 MHz or less can be −20 dB or less. Therefore, the radio wave absorbent of the present invention can be applied to a field of the measurement of an electromagnetic noise of a precision apparatus associated device and the like. In addition, since the range of the composition satisfying the above-mentioned characteristics is wide, the radio wave absorbent of the present invention can be relatively easily produced.

BEST MODE FOR CARRYING OUT THE INVENTION

Hereinbelow, the embodiment of the present invention will be described in detail.

The radio wave absorbent of the present invention comprises, as a main component, a manganese-nickel-copper-zinc system ferrite comprising 2.0 to 14.5 mol %, preferably 10.0 to 12.5 mol % of nickel oxide; 3.5 to 17.0 mol %, preferably 5.0 to 8.5 mol % of copper oxide; 30.0 to 33.0 mol %, preferably 31.5 to 32.7 mol % of zinc oxide; 0.5 to 10.0 mol %, preferably 1.0 to 3.0 mol % of manganese oxide; and 40.0 to 50.5 mol %, preferably 46.2 to 48.5 mol % of iron oxide. The term "main component" used in the present invention means a component which constitutes 90% by weight or more of the whole weight of the radio wave absorbent.

In the composition region departing from the above-mentioned range, the frequency characteristics for a complex specific permeability required for the radio wave absorbing characteristics are not exhibited, the matching thickness of the radio wave absorbent exceeds 6.5 mm, and the Curie temperature suitable for the radio wave absorbent cannot be obtained. For example, when the initial permeability is low, the frequency of the magnetic resonance becomes high, the frequency at which the lowering of $\mu'$ (the real number part of complex specific permeability) required for the radio wave absorbing characteristics in a low frequency band occurs becomes high, and further, the peak width for the frequency of $\mu''$ (the imaginary number part of complex specific permeability) required for the radio wave absorbing characteristics becomes narrow. For this reason, the lower limit of the frequency band in which the reflectivity is −20 dB or less becomes high (the frequency band becomes narrow), and further, the matching thickness becomes large when $\mu''$ is low. Further, in the radio wave absorbent, an electromagnetic wave is converted into a thermal energy due to a magnetic loss. Therefore, when the Curie temperature is extremely low, such a converted heat causes the temperature of the radio wave absorbent per se to readily rise to a temperature higher than the Curie temperature, so that the radio wave absorbent cannot suitably function.

Specifically, for example, when the content of zinc oxide is less than 30.0 mol %, the initial permeability becomes low. On the other hand, when the content of zinc oxide is more than 33.0 mol %, the Curie temperature and $\mu''$ become low and the matching thickness becomes large. Further, when the content of copper oxide is less than 3.5 mol %, the frequency at which the lowering of $\mu'$ occurs becomes high, so that excellent radio wave absorbing characteristics in a low frequency band cannot be obtained. On the other hand, when the content of copper oxide is more than 17.0 mol %, the Curie temperature and $\mu''$ become low and the matching thickness becomes large.

In addition, the content of manganese oxide ($Mn_2O_3$) required in the present invention is larger than the content of the manganese monoxide, i.e., 0.10% by weight or less, which is disclosed in Japanese Patent Application Laid-open Specification No. 84622/1994. Further, the manganese oxide used in the present invention is not one which is accidentally mixed as a subcomponent derived from a raw material or the like, but one which is a substitute substance effective for improving the radio wave absorbing characteristics. This manganese oxide may be added as a substitute for iron oxide, and the total content of the manganese oxide ($Mn_2O_3$) and the iron oxide ($Fe_2O_3$) may be adjusted to be in the range of from 49.0 to 51.0 mol %, preferably from 49.1 to 49.8 mol %. By substituting the manganese oxide for the iron oxide, it becomes possible not only to lower a magnetic anisotropy, but also to promote a particle growth. Further, the occurrence of a segregation of copper oxide can be suppressed and the initial permeability can be increased, so that the radio wave absorption frequency band becomes wide toward the side of a low frequency. However, even though the total content of the manganese oxide and the iron oxide falls within the above-mentioned range, when the content of the manganese oxide is less than 0.5 mol %, an effect for increasing the initial permeability cannot be obtained. On the other hand, when the content of the manganese oxide is more than 10.0 mol %, the Curie temperature and $\mu''$ become low, leading to an increase in the matching thickness.

Further, the total content of the manganese oxide ($Mn_2O_3$) and the iron oxide ($Fe_2O_3$) exceeds the above-mentioned range, the initial permeability and $\mu''$ become low, leading to an increase in the matching thickness.

It is noted that nickel oxide is added as a supplemental component for maintaining the required composition.

In addition to the above-mentioned components, the radio wave absorbent of the present invention may contain one or two or more of CaO, CoO, $SiO_2$, $TiO_2$, $HfO_2$, $GeO_2$, $ZrO_2$, $MoO_3$, $WO_3$, $Bi_2O_3$, $In_2O_3$, $Cr_2O_3$, $Al_2O_3$, $Ta_2O_5$, $Nb_2O_5$, $V_2O_5$ and the like in a ratio of 1% by weight or less.

The above-mentioned radio wave absorbent of the present invention can be obtained by sintering a manganese-nickel-copper-zinc system ferrite in an air atmosphere at about 950 to 1,200° C. so that the composition obtained after sintering becomes in the above-mentioned range. In the radio wave absorbent of the present invention, the reflectivity in a wide frequency band of from a frequency as low as 40 MHz or less may be −20 dB or less, and the matching thickness may be 6.5 mm or less , and further, the reflectivity at 30 MHz or less can be −20 dB or less and the matching thickness can be 6 mm or less.

The present invention is described below in more detail with reference to the following Examples and Comparative Examples.

First, the components of the radio wave absorbent were individually weighed so that the composition obtained after sintering becomes in the following range, and wet-blended together by means of a steel ball mill for 15 hours.

nickel oxide (NiO): 2.0 to 14.5 mol % copper oxide (CuO): 3.5 to 17.0 mol % zinc oxide (ZnO): 30.0 to 33.0 mol % manganese oxide ($Mn_2O_3$): 0.5 to 10.0 mol % iron oxide ($Fe_2O_3$): 40.0 to 50.5 mol %

Subsequently, the blended powder was tentatively calcined in an air atmosphere at 900° C. for 2 hours, and then, wet-ground by means of a steel ball mill for 15 hours. To the resultant manganese-nickel-copper-zinc system ferrite powder was added an aqueous solution of polyvinyl alcohol in an amount of 10% by weight, and the resultant mixture was pelletized, followed by molding into a desired shape under a pressure of 1 ton/cm$^2$. The molded material was sintered in an air atmosphere at a predetermined temperature in the range of from 950 to 1,200° C. for 3 hours, to thereby obtain a radio wave absorbent (Examples 1 to 27). With respect to each of the obtained radio wave absorbents (Examples 1 to 27), the composition and the sintering temperature are shown in Table 1. Further, with respect to each of these radio wave absorbents (Examples 1 to 27), the matching thickness and the frequency band for the reflectivity of −20 dB or less were measured by the following method, and results are shown in Table 1.

Method of Measuring Matching Thickness and Reflectivity of Radio Wave Absorbent

With respect to each component, the radio wave absorbing characteristics of the radio wave absorbent were measured as follows. The radio wave absorbent was processed into an annular shape having an outer diameter of 19.8 mm and an inner diameter of 8.6 mm, and then, the processed absorbent was inserted into a coaxial tube and a reflection coefficient was measured by a network analyzer. From the results obtained by the measurement, the reflectivity and the normalized impedance of the radio wave absorbent front face were calculated. The normalized impedance Z and the reflection coefficient S have the following relationship:

$$Z=(1+S)/(1-S)$$

$$S=(Z-1)/(Z+1)$$

$$S=S_{sample}/S_{metal}$$

$$-20 \log |S|=dB$$

The normalized impedance of each thickness was plotted in Smith chart, and the thickness passing along the center of the Smith chart was obtained by the least square method, and the obtained thickness was regarded as a matching thickness. Further, the ring having the calculated matching thickness was actually prepared, and the frequency band for the reflectivity of −20 dB or less was measured by the above-mentioned coaxial tube method.

Further, for comparison, the radio wave absorbents having compositions after sintering departing from the above-mentioned ranges (Comparative Examples 1 to 8) were prepared in the same manner as in the preparations of the above-mentioned radio wave absorbents (Examples 1 to 27). With respect to each of the prepared radio wave absorbents (Comparative Examples 1 to 8), the composition and the sintering temperature are shown in Table 2. Further, with respect to each of these radio wave absorbents (Comparative Examples 1 to 8), the matching thickness and the frequency band for the reflectivity of −20 dB or less were measured in the same manner as in the measurements for the above-mentioned radio wave absorbents, and results are shown in Table 2.

TABLE 1

| Radio Wave | Composition (Mol %) | | | | | Sintering Temperature | Matching Thickness | Frequency Band for Reflectivity of −20 dB or less |
|---|---|---|---|---|---|---|---|---|
| Absorbent | NiO | CuO | ZnO | $Fe_2O_3$ | $Mn_2O_3$ | (° C.) | (mm) | (MHz) |
| Example 1 | 8.9 | 11.3 | 30.8 | 45.2 | 3.8 | 1020 | 5.9 | 40~400 |
| Example 2 | 8.9 | 11.3 | 30.8 | 43.3 | 5.7 | 1020 | 6.3 | 30~350 |
| Example 3 | 8.8 | 11.0 | 30.9 | 43.4 | 5.9 | 1020 | 6.2 | 40~400 |
| Example 4 | 8.3 | 11.5 | 30.9 | 43.4 | 5.9 | 1020 | 6.4 | 30~400 |
| Example 5 | 7.8 | 12.0 | 30.9 | 43.4 | 5.9 | 1020 | 6.4 | 30~350 |
| Example 6 | 8.0 | 12.0 | 30.7 | 43.4 | 5.9 | 1020 | 6.2 | 40~400 |
| Example 7 | 2.7 | 16.9 | 31.0 | 48.3 | 1.1 | 1010 | 6.5 | 30~400 |
| Example 8 | 8.7 | 11.4 | 30.2 | 40.7 | 9.0 | 1040 | 6.4 | 40~400 |
| Example 9 | 8.8 | 11.4 | 30.3 | 40.1 | 9.4 | 1040 | 6.5 | 40~400 |
| Example 10 | 8.0 | 10.9 | 31.0 | 49.6 | 0.5 | 1090 | 6.a | 40~450 |
| Example 11 | 8.7 | 10.0 | 32.0 | 48.1 | 1.2 | 1040 | 6.2 | 20~400 |
| Example 12 | 10.8 | 8.0 | 31.8 | 48.3 | 1.1 | 1060 | 5.9 | 30~400 |
| Example 13 | 10.9 | 7.5 | 32.1 | 47.4 | 2.1 | 1060 | 5.8 | 30~400 |
| Example 14 | 10.9 | 7.5 | 32.2 | 46.3 | 3.1 | 1070 | 6.0 | 30~400 |
| Example 15 | 11.2 | 7.6 | 32.0 | 47.2 | 2.0 | 1050 | 5.8 | 30~400 |
| Example 16 | 11.4 | 7.6 | 31.9 | 47.1 | 2.0 | 1040 | 5.6 | 30~400 |
| Example 17 | 10.9 | 8.1 | 31.9 | 47.1 | 2.0 | 1050 | 5.9 | 30~400 |
| Example 18 | 10.4 | 8.5 | 31.9 | 47.2 | 2.0 | 1040 | 6.0 | 30~400 |
| Example 19 | 12.8 | 5.1 | 32.6 | 47.4 | 2.1 | 1100 | 6.1 | 30~400 |
| Example 20 | 11.7 | 6.6 | 32.2 | 47.4 | 2.1 | 1100 | 6.0 | 30~400 |
| Example 21 | 7.1 | 11.0 | 31.1 | 50.3 | 0.5 | 1110 | 6.2 | 40~400 |
| Example 22 | 10.9 | 8.0 | 32.1 | 47.0 | 2.0 | 1050 | 6.2 | 30~400 |
| Example 23 | 10.6 | 8.0 | 32.1 | 47.3 | 2.0 | 1050 | 6.0 | 30~400 |
| Example 24 | 10.3 | 8.0 | 32.1 | 47.6 | 2.0 | 1050 | 6.0 | 30~400 |
| Example 25 | 10.2 | 8.0 | 32.1 | 47.7 | 2.0 | 1100 | 6.0 | 30~400 |
| Example 26 | 9.9 | 8.0 | 32.1 | 48.0 | 2.0 | 1100 | 6.1 | 30~400 |
| Example 27 | 14.2 | 3.6 | 32.9 | 47.3 | 2.0 | 1100 | 6.3 | 40~400 |

TABLE 2

| Radio Wave Absorbent | Composition (Mol %) NiO | CuO | ZnO | $Fe_2O_3$ | $Mn_2O_3$ | Sintering Temperature (° C.) | Matching Thickness (mm) | Frequency Band for Reflectivity of −20 dB or less (MHz) |
|---|---|---|---|---|---|---|---|---|
| Comparative Example 1 | 11.5 | 8.3 | 30.9 | 48.9 | 0.4 | 1010 | 5.2 | 70~450 |
| Comparative Example 2 | 1.6 | 18.0 | 31.1 | 48.4 | 0.9 | 1010 | 7.3 | 40~350 |
| Comparative Example 3 | 8.8 | 11.2 | 30.8 | 49.1 | 0.1 | 1010 | 5.4 | 60~450 |
| Comparative Example 4 | 9.8 | 11.3 | 29.8 | 46.2 | 2.9 | 1010 | 5.2 | 70~450 |
| Comparative Example 5 | 9.7 | 11.0 | 30.0 | 38.3 | 11.0 | 1050 | 7.1 | 60~350 |
| Comparative Example 6 | 6.7 | 11.0 | 31.0 | 50.8 | 0.5 | 1140 | 6.7 | 40~500 |
| Comparative Example 7 | 13.8 | 3.7 | 33.2 | 47.2 | 2.1 | 1110 | 6.9 | 30~400 |
| Comparative Example 8 | 15.1 | 2.7 | 32.9 | 47.3 | 2.0 | 1100 | 6.1 | 60~450 |

As shown in Table 1, with respect to each of the radio wave absorbents of the present invention (Examples 1 to 27), it was confirmed that the matching thickness is 6.5 mm or less, and the reflectivity in a wide frequency band of from a frequency of 40 MHz or less is −20 dB or less. Especially, with respect to each of the radio wave absorbents (Examples 12 to 18, 20, and 23 to 25) which comprises a manganese-nickel-copper-zinc system ferrite comprising 10.0 to 12.5 mol % of nickel oxide, 5.0 to 8.5 mol % of copper oxide, 31.5 to 32.7 mol % of zinc oxide, 1.0 to 3.0 mol % of manganese oxide, and 46.2 to 48.5 mol % of iron oxide, wherein the total content of the manganese oxide and the iron oxide is in the range of from 49.1 to 49.8 mol %, it was confirmed that the matching thickness is 6.0 mm or less, and the reflectivity in a wide frequency band of from a frequency of 30 MHz is −20 dB or less.

The radio wave absorbents of the present invention (Examples 1 to 27) are observed in more detail as follows. In accordance with the increase of the zinc oxide content in the range of from 30.0 to 33.0 mol %, the matching thickness becomes large, but the lower limit of the frequency band satisfying the reflectivity of −20 dB or less tends to become low (e.g., Examples 5 and 6).

In accordance with the increase of the copper oxide content in the range of from 3.5 to 17.0 mol %, the matching thickness becomes large, but the lower limit of the frequency band satisfying the reflectivity of -20 dB or less tends to become low (e.g., Examples 3 and 4).

When the manganese oxide is substituted for the iron oxide while maintaining the content of the manganese oxide in the range of from 0.5 to 10.0 mol %, in accordance with the increase in the amount substituted, the lower limit of the frequency band satisfying the reflectivity of −20 dB or less becomes low and the matching thickness tends to become large (e.g., Examples 1 and 2).

Further, when the total content of the manganese oxide and the iron oxide is in the range of from 49.1 to 49.8 mol %, the matching thickness becomes a minimum value (e.g., Examples 23 to 25 among Examples 22 to 26). When the total content of the manganese oxide and the iron oxide falls outside the above range and in the range of from 49.0 to 51.0 mol %, the matching thickness tends to become large (e.g., Examples 22 and 26 among Examples 22 to 26).

On the other hand, each of the radio wave absorbents (Comparative Examples 1 to 8) shown in Table 2 is comprised of a manganese-nickel-copper-zinc system ferrite similar to the radio wave absorbent of the present invention; however, it was found that each of these radio wave absorbents has any of the following characteristics that: (1) the matching thickness is more than 6.5 mm; and that (2) the lower limit of the frequency band satisfying the reflectivity of −20 db or less is more than 40 mhz.

What is claimed is:

1. A radio wave absorbent obtained by sintering a manganese-nickel-copper-zinc system ferrite material, which comprises:

as a main component, a manganese-nickel-copper-zinc system ferrite comprising 2.0 to 14.5 mol % of nickel oxide, 3.5 to 17.0 mol % of copper oxide, 30.0 to 33.0 mol % of zinc oxide, 0.5 to 10.0 mol % of manganese oxide, and 40.0 to 50.5 mol % of iron oxide.

2. The radio wave absorbent according to claim 1, wherein said manganese-nickel-copper-zinc system ferrite comprises 10.0 to 12.5 mol % of nickel oxide, 5.0 to 8.5 mol % of copper oxide, 31.5 to 32.7 mol % of zinc oxide, 1.0 to 3.0 mol % of manganese oxide, and 46.2 to 48.5 mol % of iron oxide, wherein the total content of the manganese oxide and the iron oxide is in the range of from 49.1 to 49.8 mol %.

3. The radio wave absorbent according to claim 1, wherein a reflectivity at 30 MHz is −20 dB or less and a matching thickness is 6 mm or less.

* * * * *